June 16, 1964     J. HÄNNY ET AL     3,137,439
CENTERING THE PISTON OF A PISTON COMPRESSOR
Filed Nov. 6, 1961

INVENTORS.
JOST HÄNNY
ALFRED ZÜRCHER.
BY
K. A. May
ATTORNEY.

3,137,439
CENTERING THE PISTON OF A PISTON COMPRESSOR
Jost Hänny and Alfred Zürcher, both of Winterthur, Switzerland, assignors to Sulzer Freres, S.A., Winterthur, Switzerland, a corporation of Switzerland
Filed Nov. 6, 1961, Ser. No. 150,222
Claims priority, application Switzerland Mar. 14, 1958
4 Claims. (Cl. 230—188)

The present invention relates to means for centering the piston of a piston compressor for compressing gases, the cylindrical surface of the piston being provided with circumferential grooves or other labyrinthlike recesses having a self-sealing effect so that no foreign lubricant need be present in the cylinder.

The present application is a continuation-in-part of copending application Serial No. 798,461, filed March 10, 1959, now Patent No. 3,035,879.

In conventional compressors of this type the piston is guided by means located outside of the cylinder, namely by the crosshead guide and a guide engaging the piston rod.

In the system according to the invention a force is produced during operation of the compressor which force acts in radially inward direction and is increased upon a decrease of the spacing between the piston and its cylinder and conversely. Action of the force in the opposite direction is impeded. This centering force may be aerodynamic and produced inside or outside of the cylinder, whereby, in the latter case, a foreign gas may be introduced into the cylinder. The force may also be magnetic and act from the outside of the cylinder.

In the compressor according to the invention either the piston or the cylinder or both may be provided with means producing aerodynamic centripetal forces acting on the piston whereby the operating medium may be taken from the medium pumped by the compressor. These means may be in the form of chambers provided in the circumferential outside surface of the piston and/or in the inside surface of the cylinder and filled with compressed gas from the compression chamber of the compressor cylinder or from an outside source.

In compressors equipped according to the invention and having a very small clearance between the piston and its cylinder which clearance normally increases due to abrasion, this abrasion is much reduced so that the desired small clearance is retained and the piston or its self-packing coat need be replaced much less often than in conventional compressors. If the compressor must produce a high pressure and/or operate at high efficiency, the initial clearance between the piston and its cylinder can be made smaller than in conventional self-packing compressors.

A compressor equipped according to the invention can be subjected to greater vibrations than a conventional compressor without danger of contact between the piston and the cylinder. A guide of the piston rod between the cross-head guide and the piston can be omitted so that the piston rod can be made shorter.

In the conventional self-packing compressor the self-packing means extend over the entire cylindrical surface of the piston. This is not possible with the piston according to the invention because of the space required for the centering means, unless the latter are made part of the cylinder. This, however, does not reduce the self-packing effect because, if the piston is centered according to the invention, the clearance between the piston and the cylinder can be so much reduced that a piston having less self-sealing surface has a better self-packing effect than a conventional piston of the same length and whose self-sealing surface is not reduced. This has been proven by tests.

For aerodynamically centering the piston in the manner according to the invention preferably the gas in the compression space of the cylinder or leakage gas therefrom is used. An outside gas, preferably of the same character as the compressed gas may be used, particularly during the starting period when there is no pressure or an insufficient gas pressure in the compression space of the cylinder and centering by leakage gas is insufficiently effective. In both cases, when leakage gas is used as well as when outside gas is used, the gas is either conducted to the cylindrical outside surface of the piston and/or to the interior surface of the cylinder.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Figure 1:
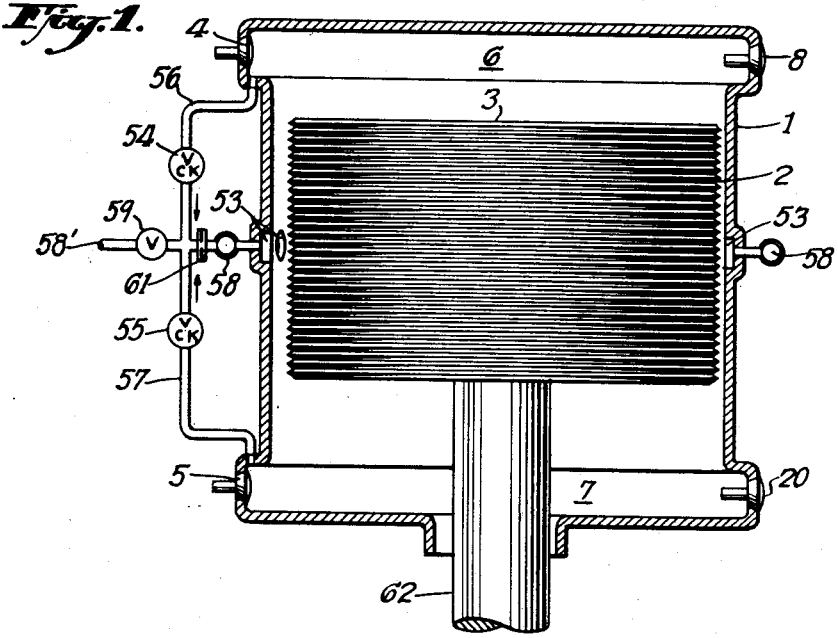
FIG. 1 is a longitudinal sectional view of a compressor provided with centering means according to the invention.

Referring more particularly to the drawing, numeral 1 designates the cylinder of a piston compressor whose piston 3 is provided with circumferential grooves 2. The piston is connected to a piston rod 62 and is double acting. The gas to be pumped is alternatingly introduced through suction valves 4 and 5 into compression chambers 6 and 7, respectively, and relieved to the outside through pressure valves 8 and 20.

The inside wall of the cylinder 1 is provided with cavities 53 which are equally spaced around the inside wall of the cylinder and which are connected through a conduit 58 extending around the cylinder to conduits 56 and 57 in which check valves 54 and 55, respectively, are interposed. A throttling orifice 61 may be interposed between the conduit 58 and the conduits 56 and 57. The latter terminate in the compression chambers 6 and 7, respectively. The conduit 58 may be supplied with outside gas, particularly during starting of the compressor, a conduit 58' with a valve 59 being provided for this purpose.

Figure 2:
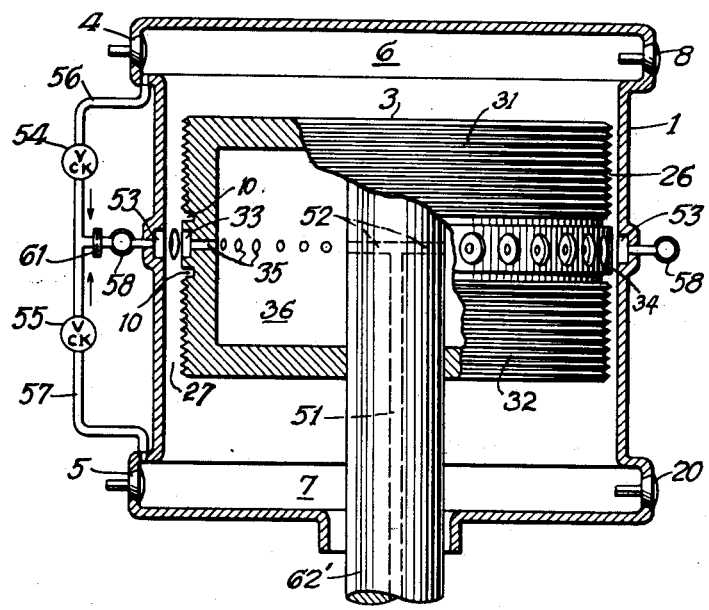
FIG. 2 is a part sectional view of a modified cylinder and piston arrangement according to the invention.

FIG. 2 illustrates a modification wherein outside gas is supplied through channels 51, 52 in a piston rod 62' to the inside of the hollow piston 3. The latter has grooved upper and lower self-packing portions 31 and 32. Between these portions a centering portion 34 is arranged having a plurality of centering cavities 33 equally spaced all around the piston. On either axial side of the portion 34 annular grooves 10 are provided. The cavities 33 communicate through throttling channels 35 with the interior 36 of the piston. Gas flows into the interior of the piston through the channels 51 and 52 and thereupon through the channels 35 into the cavities or chambers 33. In those of the latter which are opposite to the relatively narrow clearance portion 26 a higher pressure will be built up than on the opposite cavities or chambers 33 where the clearance 27 is wider so that a centering effect acting from the right side to the left side in FIG. 2 is produced. At the narrow portion of the clearance gas passes from the cavities 33 into the grooves 10 and is conducted through the latter to the wide clearance portion 27 and therefrom into one of the compression chambers.

The centering means shown and described can also be used in connection with single acting compressors. In this case, the bottom of the cylinder is open and the valves 5 and 20 are omitted. Also omitted is the conduit 57 containing the valve 55.

We claim:
1. In a piston compressor:
   a hollow cylinder closed at both ends and having an inside surface,
   a piston reciprocating in said cylinder and alternatingly defining a compression chamber and a suction chamber at each end of said cylinder,
   a narrow clearance between the circumferential surface of said piston and the opposite inside surface of said cylinder for affording frictionless movement of said piston in said cylinder and inhibiting flow of operating medium alongside said piston,
   at least three equally spaced apertures in said cylinder placed circumferentially thereof, and
   valved conduit means communicating said apertures in said cylinder with the compression chambers and closing said apertures against the suction chambers for forcing operating medium through said apertures against the circumference of said piston for centering the latter in said cylinder.
2. In a piston compressor as defined in claim 1 and wherein said apertures are in a plane normal to the longitudinal axis of and substantially in the center of said cylinder.
3. In a piston compressor as defined in claim 1, a conduit connected to said conduit means for supplying a gas from the outside of said cylinder to said apertures.
4. In a piston compressor as defined in claim 1 and wherein said piston is hollow, circumferentially spaced apertures being provided in said piston communicating the interior of said piston with the circumferential outside thereof, a piston rod being connected to said piston and having a channel therein terminating in the interior of said piston for supplying a gas from the outside of said cylinder to the interior of said piston and to said last mentioned apertures.

References Cited in the file of this patent
UNITED STATES PATENTS

| | | |
|---|---|---|
| 368,684 | Jones | Dec. 5, 1882 |
| 2,971,465 | Caillaud | Feb. 14, 1961 |